United States Patent [19]

McLellan

[11] 4,282,684

[45] Aug. 11, 1981

[54] BAND TYPE PLANT TRANSPLANTER

[76] Inventor: Norvel J. McLellan, 1002 N. Main St., Pleasanton, Tex. 78064

[21] Appl. No.: 62,566

[22] Filed: Aug. 1, 1979

[51] Int. Cl.³ .............................................. A01G 23/04
[52] U.S. Cl. ........................................... 47/73; 111/4; 294/50.7
[58] Field of Search ........................ 47/73, 1; 111/4; 294/50.7, 50.8

[56] References Cited

U.S. PATENT DOCUMENTS

| | | | |
|---|---|---|---|
| 217,383 | 7/1879 | James | 111/4 |
| 327,557 | 10/1885 | Kohler | 294/50.8 |
| 565,745 | 8/1896 | Harris | 294/50.7 |
| 985,596 | 2/1911 | Jacobs | 111/4 X |
| 1,194,992 | 8/1916 | Gibson | 47/1 |
| 3,025,636 | 3/1962 | Warren | 47/73 |
| 3,471,192 | 10/1969 | Childs et al. | 47/73 X |

Primary Examiner—Robert E. Bagwill

[57] ABSTRACT

The invention is a device that allows plants to be transplanted with minimum disturbance to the soil around the roots.

3 Claims, 4 Drawing Figures

BAND TYPE PLANT TRANSPLANTER

BACKGROUND

The invention is a tool for use in transplanter plants. It works in most soil types and when used properly it will minimize transplanter shock.

SUMMARY OF INVENTION

It is object of invention to provide a method of placing a band around the plant roots and the soil that is around the plant roots before the plant is removed from the soil.

DESCRIPTION OF DRAWINGS

FIG. one is a cross section view of three piece type.
FIG. two is a top view of three piece type.
FIG. three is side view of five piece type.
FIG. four is cross section view of five piece type.

DESCRIPTION OF INVENTION

Figure 2:
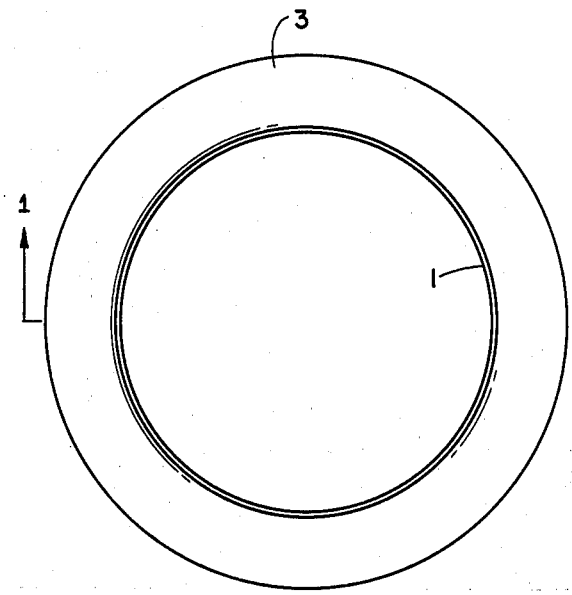
Figure 3:
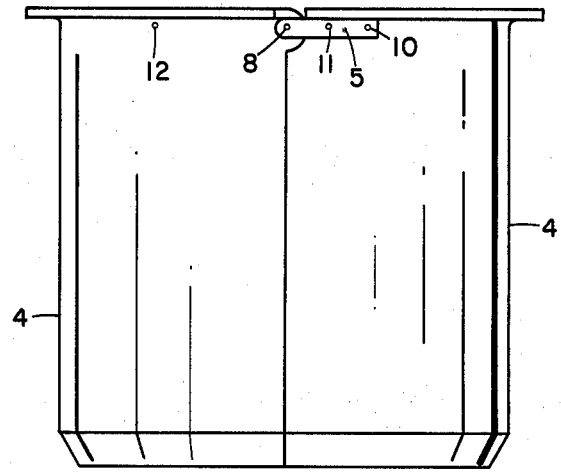
Figure 1:
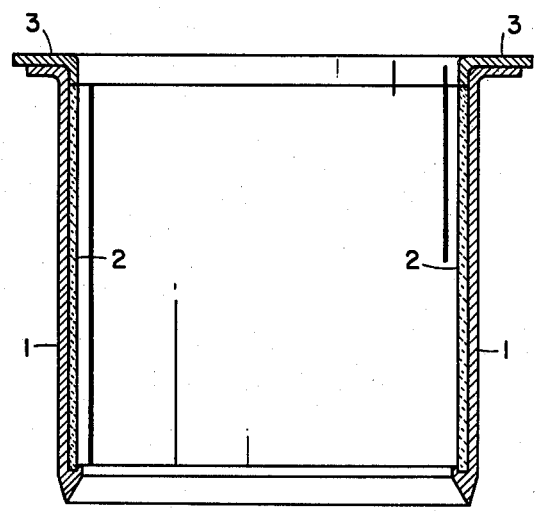
Figure 4:
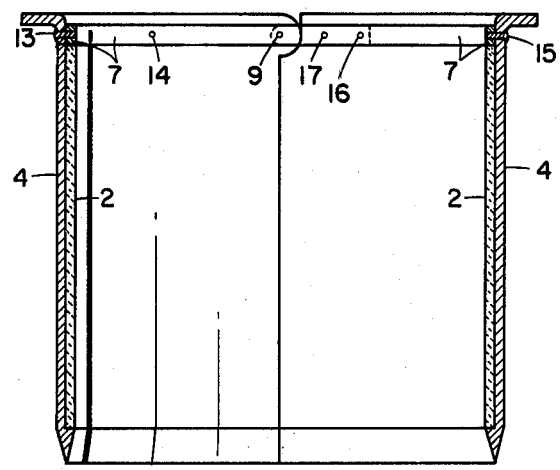

Part number one of figure one is cylinder with sharp rim on bottom and a flange on top and an inner peripheral ledge at lower end. Part number two is the band. If the plant is to be reset soon cardboard may be used but if the plant is to stored a moisture resistant band is used. Part number three is band stop. It holds band in place while the tool is being inserted into soil.

To use the tool of figure one it is assembled as shown in figure one. The tool is slipped over the top of the plant with the sharp rim down. Downward pressure is applied to the band stop equally on opposite sides. When tool has been inserted to the desired depth the tool is pulled out with upward pressure on the flange of the cylinder. The plant and band is removed from the cylinder by removing the band stop, placing hand over tool with plant stem between fingers and turning tool upside down.

Referring to figure three and four:

Part number four is a split cylinder with sharp rim on bottom and flange on top and an inner peripheral ledge at lower end. Part number five and six are hinges. Part number seven is band stop, it holds band in place while tool is inserted into soil. Part number two is band. If the plant is to be reset soon cardboard band may be used. If plant is to be stored a moisture resistant band is used.

To use the tool the cylinder is spread at the bottom and band placed inside. The tool is closed and slipped over top of plant with sharp rim down. Downward pressure is applied to the flange of the cylinder on opposite sides. When tool has been inserted to the derired depth the tool is pulled out by placing fingers on each side of cylinder below the hinges, pressing inward and pulling up.

Plant and band is removed from tool by spreading split cylinder at bottom.

Part numbers eight and nine are rivets and allow the hinges to pivot. Part numbers ten thru seventeen are pins that hold hinges and band stop in place.

I claim:

1. A transplanting device comprised of a cylinder open at each end, terminating at its upper end in an outwardly directed peripheral flange, the lower end terminating in a sharpened edge for ground penetration, said lower end having an inner peripheral ledge, and means at said upper end providing an additional inner peripheral ledge, said ledges and the inner wall of said cylinder being adapted to seat a plant band therein.

2. A transplanting device as in claim 1, wherein said upper end ledge providing means is integral with said cylinder, and said cylinder is in two parts which are hinged together to permit opening of said cylinder so that a plant band may be inserted therein.

3. A transplanting device as in claim 1, wherein said upper end ledge providing means is removable from said cylinder so that a plant band may be inserted therein.

* * * * *